Aug. 30, 1938.  H. H. KRAMER  2,128,709

CLOTH MEASURING AND YARDAGE PRINTING DEVICE

Filed March 2, 1937  3 Sheets-Sheet 1

Inventor.
H. H. Kramer
By Mason Fenwick & Lawrence
Attorneys

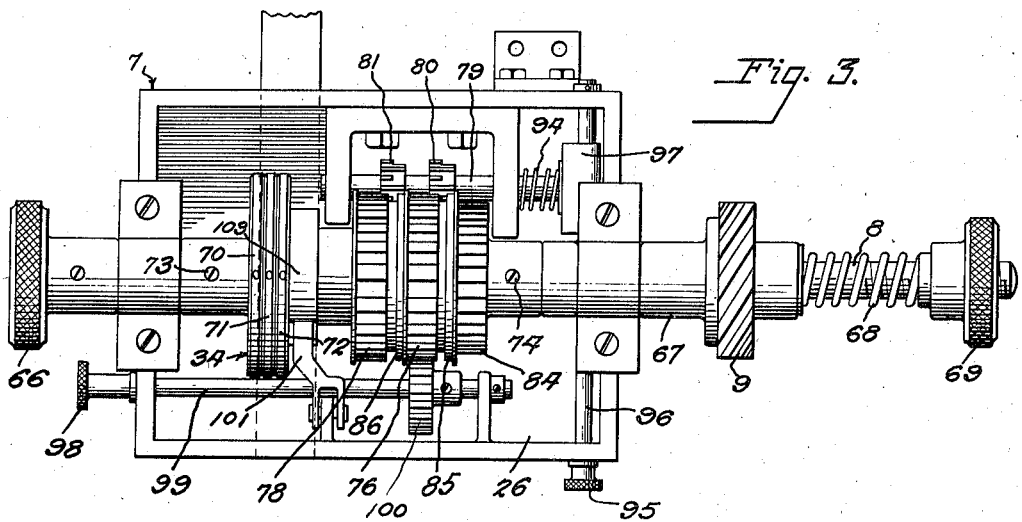
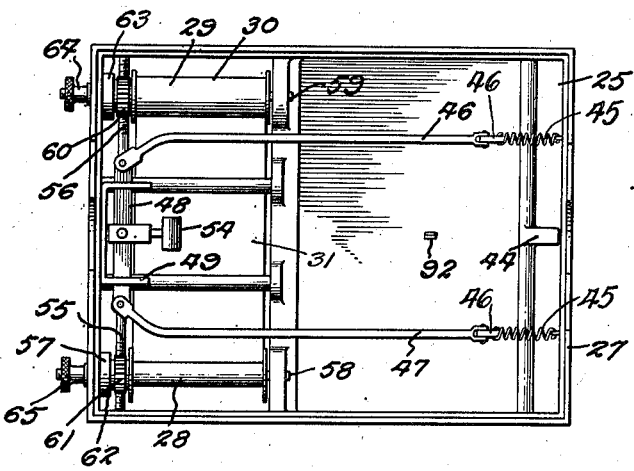
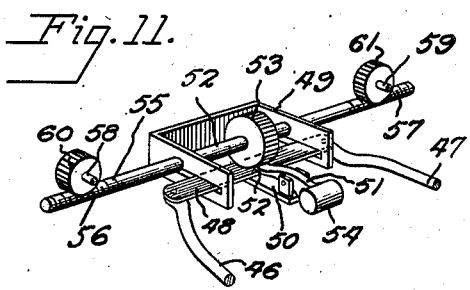

Aug. 30, 1938.  H. H. KRAMER  2,128,709
CLOTH MEASURING AND YARDAGE PRINTING DEVICE
Filed March 2, 1937  3 Sheets-Sheet 3
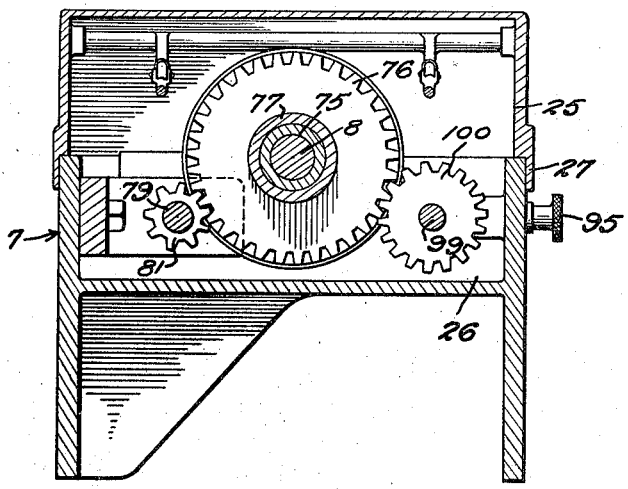
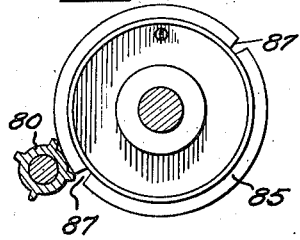
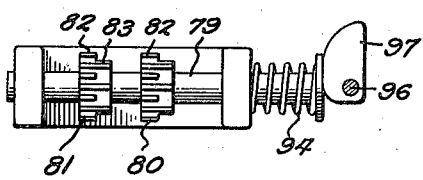
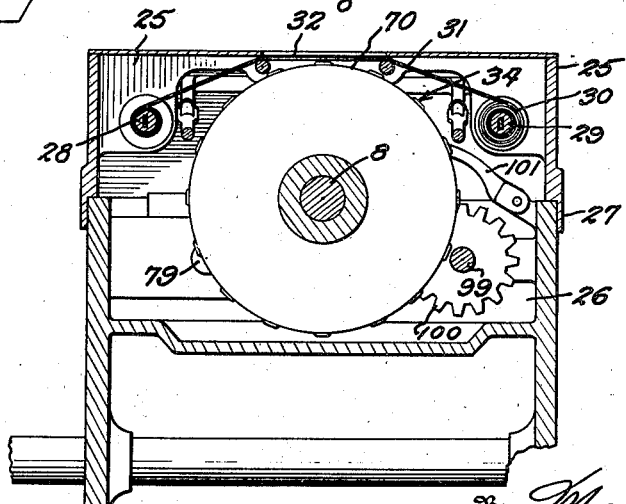
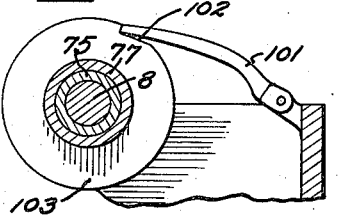
Inventor
H. H. Kramer Patented Aug. 30, 1938

2,128,709

UNITED STATES PATENT OFFICE 2,128,709

CLOTH MEASURING AND YARDAGE PRINT-
ING DEVICE

Hans H. Kramer, Passaic, N. J.

Application March 2, 1937, Serial No. 128,668

6 Claims. (Cl. 33—129)

This invention relates to measuring devices for measuring the aggregate length of a piece of cloth or other strip material and printing the total yardage on a card.

One of the objects of the invention is to provide a measuring and printing device of the class described in which the revolutions counting mechanism automatically disconnects itself from the cloth measuring roll when the end of the cloth is reached.

Another object of the invention is to provide a measuring and printing device in which the revolutions counting and printing mechanisms are oriented into proper positions to print the total yardage responsive to the movement of the cloth past and in engagement with an element of the device, but in which the printing act is done manually at will, and may be deferred to any suitable time after the goods has completed its movement past the machine.

Other objects of the invention will appear as the following description of a preferred and practical embodiment thereof proceeds.

In the drawings which accompany and form a part of the following specification and throughout the several figures of which the same characters of reference have been employed to designate identical parts:

Figure 3 is a top plan view of the lower section;

Figure 4 is an inverted plan view of the upper section;

Figure 5 is a section taken along the line 5—5 of Figure 2; the mechanism which is mounted on the exterior of the upper section being omitted.

Figure 6 is a detail view showing one of the locking gears in locking position;

Figure 7 is a fragmentary view showing aligning mechanism;

Figure 8 is a section taken along the line 8—8 of Figure 2; the mechanism which is mounted on the exterior of the upper section being omitted.

Figure 9 is a top elevation of the locking gear unit showing the release cam;

Figure 10 is a sectional view showing the pawl which prevents rotation of the main shaft past zero position when being set to zero; and Figure 11 is a perspective view showing the means for reversing the direction of travel of the printing ribbon.

Figure 1:
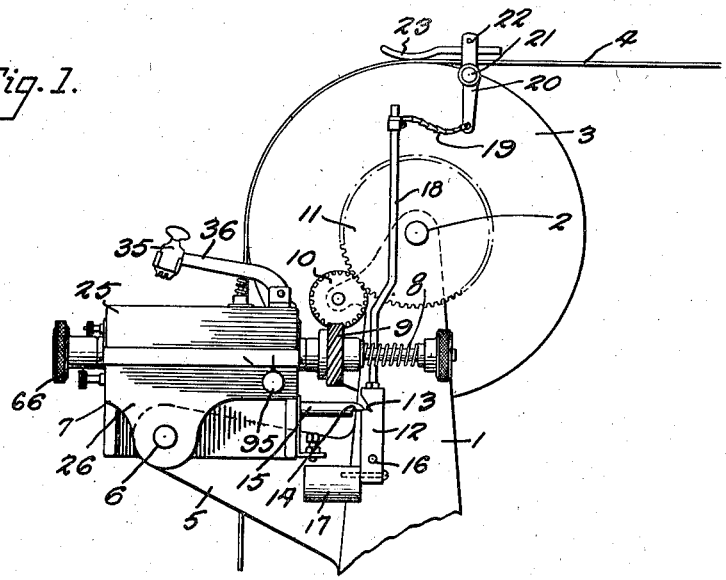
Figure 1 is a side elevation of the cloth measuring and printing apparatus.

Referring now in detail to the several figures, the numeral 1 represents a frame having a journal 2 adjacent its upper end, carrying a roll 3 over which the cloth passes in the act of being measured, the cloth being indicated at 4. The frame is provided with a bracket 5 having a journal 6 in which is tiltably mounted the casing 7 which carries the revolutions counting and printing mechanism. A shaft 8 extends longitudinally through the casing 7 and carries externally a worm 9. Said worm meshes with the smaller gear of a reduction pair 10 and 11 journalled in the frame 1 and the large gear 11 being rotatable with the roll 3.

The casing 7 is journalled in an unbalanced position so that the worm 9 will drop out of engagement with the gear 10 when the casing 7 is left unsupported. Normally, that is to say, when the revolutions counting mechanism is operatively connected to the roll 3, the casing 7 is supported by a latch 12 having a notch 13 engaging the nose 14 of a pin 15 which projects from the casing 7. The latch 12 is pivotally mounted to the frame at 16 and is normally kept in engagement with the pin 15 by means of a weight 17. A rod 18 extends upwardly from the latch and is connected by suitable means such as the chain 19 to a rocking lever 20 pivotally mounted at 21 on a fixed part of the machine. The upper arm 22 of the rocking lever extends over the edge of the piece of goods 4 and carries a feeler 23 which presses against the cloth. The cloth passes between the feeler and roll 3. When the end of the cloth has passed beneath the feeler 23 the latter falls on the surface of the roll 3 and the slight depression which it thus undergoes tilts the rocking lever 20, pulls the chain 19 and rocks the latch 12 to the rightward drawing the notch 13 from under the nose 14, thus removing the support from the unbalanced casing 7, thus causing it to drop or tilt. This disconnects the worm 9 from the gear 10. To restore the casing 7 to active position, the operator manually pushes it up into a level position, until the nose 14 of the pin 15 slips into the notch 13. The weight 17 rocks the latch beneath the nose of the pin. An adjusting screw 24 is provided engageable with the weight 17 so that the depth of engagement of the notch 13 with the nose 14 can be properly regulated. In this manner the revolutions counting and printing mechanism responds to the length of goods being measured and automatically disconnects itself when the given length of goods has passed through the machine.

The casing 7 is divided into upper and lower sections 25 and 26, respectively. Figure 8 shows that the top section has the marginal flange 27 overlapping the lower section. This is an unimportant detail of the invention. The top section contains the inking mechanism and may be removed altogether from the lower section for replenishing the inking ribbon. The inking mechanism consists of oppositely placed rollers 28 and 29, one of them having a roll of ink ribbon 30 which in the operation of the device is gradually rolled upon the other roller 28 and then through suitable reversing mechanism back again to the roller 29. The space between the rollers is bridged by the flat sheet of inking ribbon 31 which is exposed through a little opening 32 in a removable plate 33. Below the ribbon 31 are the type carrying dials 34 and above the ribbon is the printing head 35. The latter consists of an arm 36 pivotally mounted at 37 to upstanding lugs 38 on the upper section of the casing and at its free end the arm 36 carries the hammer member 39 having a handle 40 at its upper end adapted to be struck with the hand and a soft rubber pad 41 at its lower end adapted to engage a card placed beneath the pad and the ribbon. When the printing head is pressed down by the hand, it pushes the card and the ribbon against the type on the underlying dials and thus prints the card with whatever characters were in uppermost alignment on the dials.

Figure 2:
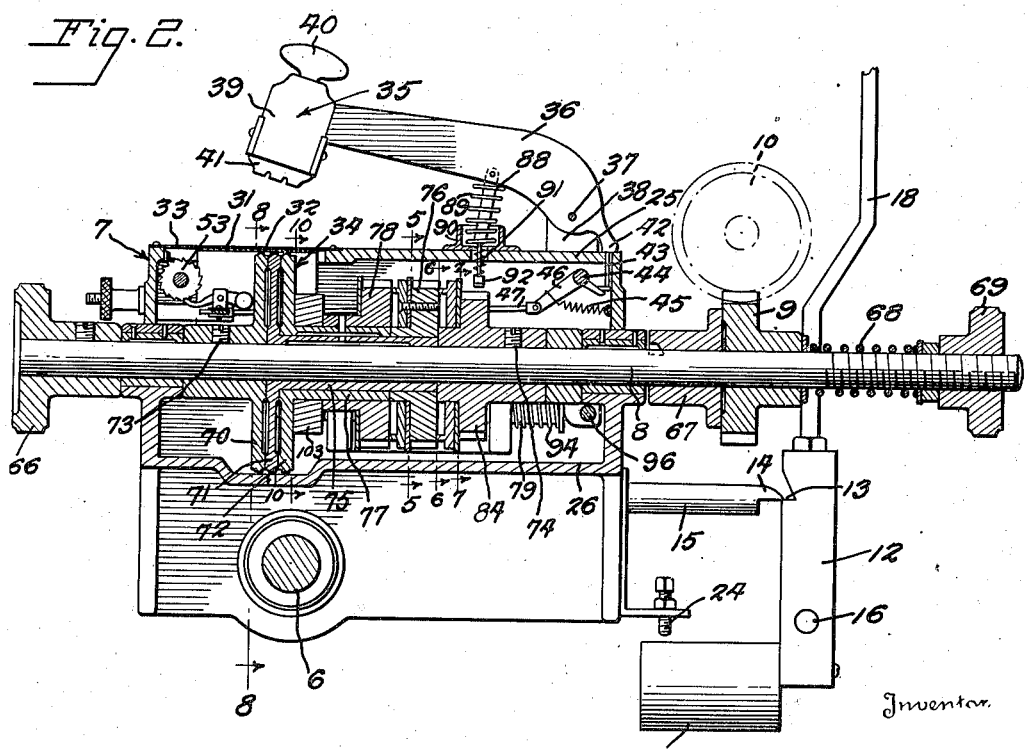
Figure 2 is a longitudinal section.

Referring to Figure 2 and then to Figures 4 and 11, it will be observed that each of the arms 36 has a tail piece 42 which when the arm 36 is in raised position pushes down upon a plunger 43, the lower end of which rocks a pivoted lever 44. When the arm 36 is depressed the lever returns to normal position under the contraction of the spring 45. The pivoted lever 44 has two links 46 and 47 connected thereto, which links at their forward ends are connected to a cross bar 48. Said cross bar passes through slots in a suitable sub-frame 49. Said cross bar at an intermediate part carries an extension 50 on which is journalled a pawl 51, the nose 52 of which engages teeth on the gear 53. The pawl is biased into position of constant engagement with said teeth by means of a weight 54. It is obvious that when the lever 44 is pulled by the springs 45, the pawl 51, see Figure 2 is drawn back to engage a new tooth on the gear 53 and that when the lever 44 is moved in the opposite direction by the upward swing of the arm 36, the pawl 51 rotates the gear 53 through an angular displacement equal to the length of one tooth. The gear 53 is fixed upon a shaft 55 which has reverse screws 56 and 57 at its opposite ends. The shafts 58 and 59 of the rollers 28 and 29 extend beyond said rollers and through the forward end of the casing. Gears 60 and 61 are freely mounted on said shafts against the ends of said rollers and in engagement with the reverse screws. Pressure disks 62 and 63 are also freely mounted on said shafts and are pressed upon by the inner ends of the thumb screws 64 and 65 threaded on the ends of the shafts 58 and 59. The shaft 55 having the reverse screws 56 and 57 rotates step by step under the action of the pawl 51 against the gear 53. This step by step movement is transmitted to the gears 60 and 61, but while these gears are loose they have no effect upon the rollers 28 or 29. When either of the thumb screws is tightened against the pressure disks 62 or 63, these press one or the other gears frictionally against the corresponding roller and set that roller into rotation. After the ribbon has wound up on one roller the thumb screw associated with that roller is loosed and the opposite thumb screw tightened. This reverses the direction of rotation in which the ribbon is wound. It will be understood that a great many printing operations take place before it is necessary to reverse the direction of movement of the ribbon.

The shaft 8 has a manually operable knob 66 at one end by means of which the shaft may be turned when resetting the apparatus to zero position, and secured to said shaft adjacent the other end is a clutch member 67. The worm 9 previously referred to is free on said shaft excepting as it is normally pressed into frictional engagement with the fixed clutch member 67 by means of the spring 68 the tension of which can be adjusted by means of the knob 69. Should for any reason any part of the mechanism enclosed within the casing 7 become jammed, it is protected from further damage by the clutch connection which will slip under excessive resistance to the rotational effort produced by the passage of the cloth over the roll 3.

The three dials heretofore referred to under the general reference character 34 are specifically the one-eighth yard dial 70, the single yard dial 71 and the ten yard dial 72. Each of these dials is operatively associated with an actuating gear. The one-eighth yard dial is fixed to the shaft 8 by means of a set screw 73 through its hub. The actuating gear 84 of the one-eighth yard dial is likewise secured to the shaft 8 by means of the set screw 74 passing through its hub. The single yard dial 71 is on a sleeve 75 surrounding the shaft 8 and on the same sleeve is the actuating gear 76. The ten yard dial 72 is on a sleeve 77 which surrounds the sleeve 75 and the actuator 78 for the ten yard dial is also secured to this sleeve. The several actuators are in such frictional engagement that one would rotate the other through friction, were not the movements of certain of them at times restrained.

However, they are locked against movement at undesired times by means which are more or less conventional with revolutions counting mechanisms. A shaft 79, (see Figures 3, 5 and 9) is mounted in the lower section of the casing 7 and parallel to the main shaft 8. On said shaft are two gears 80 and 81. Each of these gears has its periphery on one side formed with a continuous series of gear teeth 82 and on its other side with teeth 83 arranged at widely spaced intervals. The actuator gears have toothed peripheries and the actuator gear 76 for the single yard dial and the actuator gear 84 of the one-eighth yard dial have smooth annular peripheral margins 86 and 85, respectively, to one side of their toothed surfaces. The locking gears 80 and 81 bridge respectively the space between the one-eighth yard actuator and the single yard actuator gear and between the single yard actuator and the ten yard actuating gear, the continuous series of teeth on said locking gears meshing with the toothed peripheries of the ten yard and single yard actuator gears and the widely spaced toothed portions of said locking gears resting with their toothless arcs normally in contact with the smooth annular surfaces of the single yard and one-eighth yard actuator gears, respectively. The smooth marginal portions 85 and 86 of the one-eighth yard and single yard actuator gears are provided at intervals with a slight indent 87 (see Figure 6) deep enough and wide enough to receive a single tooth of the associated locking gear when said tooth comes into registry with said indent. When the locking gears 80 and 81 are in such position that a tooth of each is not in registry with an indent 87, said locking gears cannot rotate and consequently cannot communicate rotation to the adjacent actuator gears with which they are in mesh.

In operation, the web of cloth 4 is drawn between the feeler 23 and against the surface of the roll 3, rotating the roll, the gear 11, the gear 10, the worm 9, and the shaft 8. The gear ratio is such that two yards of cloth pass the feeler for every complete rotation of the shaft 8. This is of course an optional ratio. Rotation of the shaft 8 turns the one-eighth yard dial 70 and also the actuator 84 associated therewith. Said actuator as can be understood from Figure 6 slides relative to the locking gear 81 without rotating the latter and consequently said locking gear holds the actuator 76 of the single yard dial against it.

After the shaft together with the one-eighth yard dial and actuator 84 has rotated through one-half revolution, one of the indents on the margin 85 of the one-eighth yard actuator gear comes into registry with a tooth of the locking gear as is just about to happen in Figure 6, whereupon the locking gear is rotated through one-fourth of its revolution and imparts a rotational step to the single yard actuator gear 76, advancing the single yard dial 71 a distance of one ordinal. After the single yard actuator gear has rotated through an arc corresponding to ten yards, one of the indents on the margin 86 of the single yard dial comes into registry with a tooth on the locking gear 81 rotating it through one quarter of its revolution and imparting a step of advance to the actuator gear 78 which controls the movement of the ten yard dial. The mode of operation of the revolutions counting mechanism is so well understood as not to require any further description.

Since an instrument of this character is accurate to within an eighth of a yard, but takes no precise account of lengths of fabric of less than one-eighth yard, provision must be made before printing the total of yardage to bring the one-eighth yard dial in exact alignment with the other dials. Before this can be done the locking gears 80 and 81 must be released. The shaft 79 on which the locking gears are mounted are endwise movable having a normal endwise position determined by the spring 94. This is the position in which the locking gears are operative. The shaft 79 is moved endwise against the spring by means of a knob 95 on the end of a shaft 96 which also carries a cam 97, the cam bearing against the end of the shaft 79 and moving it endwise so as to move the locking gears over until their wide spaced teeth are out of registry with the margins 85 and 86 of the adjacent actuator gears. The actuator gear 84 which controls the one-eighth yard dial has external peripheral teeth solely for the purpose of effecting this alignment and which is brought about at the time of printing. By referring to Figure 2, it will be noted that on the underside of the arm 36 is a pivoted pin 88 surrounded by a spring 89. The spring has its lower end seated in a cup 90 and the purpose of the spring is to normally hold the arm 36 in uppermost position, the tail piece 42 acting as a limit stop. The lower end of the pin 88 presses on top of a spring retracted stem 91 having a wedge-shaped head 92 adapted to fit between the gear teeth on the actuator gear 84. Said gear teeth are preferably made pointed as indicated at 93 in Figure 7 so that the actuator will be moved slightly to one side or the other when the wedge-shaped head 92 comes to a full seat between the teeth when the arm 36 is depressed.

If the measured yardage includes a fraction of a yard, the digit on the single yard printing dial will be slightly out of phase with the digit on the ten yard printing dial. These must also be brought into alignment. This is done by turning the knob 98 on the shaft 99 upon which is mounted a pinion 100 meshing with the teeth on the single yard actuator gear 76. Only a slight shift of this knob will be necessary to bring the digits of the single and ten yard actuator gears into alignment.

In operation the device continues to count the revolutions of the shaft 8, in terms of yards, so long as the cloth is passing between the roller 3 and feeler 23. As soon as the terminal edge of the cloth passes from beneath the feeler the latter comes down against the roll 3 rocking the lever 20 in the manner previously set forth, tripping the latch and causing the casing 7 to tilt disengaging the gears 10 and 11 and stopping the action of the revolutions counting mechanism. The aligning operation is performed after the revolutions counting mechanism has been thus disengaged from the measuring roll 3. Pressing down upon the handle 40 not only prints the number of yards and one-eighth yards indicated by the printing dials, but also as has been explained, just before the printing, aligns the one-eighth yard dial with the other dials.

After the printing is accomplished the revolutions counting mechanism must be set to zero before another measurement is taken. This is accomplished as follows: The knob 95 is turned so as to hold the locking gears 80 and 81 in released position. All the gears will now turn idle. The knob 66 on the end of the shaft 8 is now turned clockwise and catches, not shown but conventional in revolutions counting mechanism of this type, situated between the actuator gears will take one along after the other until the gears have been returned to normal zero position. The pawl 101 falls into a notch 102 on a drum 103 carried by the shaft 8 when said shaft reaches zero position and prevents the shaft being turned too far in the zero direction.

While I have in the above description disclosed what I believe to be a preferred and practical embodiment of the invention, it will be understood to those skilled in the art that the details of construction and the arrangement of parts as shown and described are in the main by way of example and that the invention concerns itself as well with broad conceptual variations of the inventive principles as defined in the appended claims.

What I claim is:

1. Cloth measuring and yardage printing device comprising a measuring unit including a roll engaged by and rotated by the cloth being measured, and a unit including revolutions counting mechanism and printing mechanism, said units being normally connected in an operative train, means tiltably supporting said revolutions-counting and printing mechanism unit in unbalanced manner with the preponderance of weight tending to break the connection of said train, means normally holding said units in operative relation in said train, said means being responsive to the termination of the cloth past the measuring point of said roll for permitting the tilting of said unbalanced unit and its consequent disengagement from said train.

2. Cloth measuring and yardage printing device comprising a measuring unit including a roll frictionally rotated by cloth passed against its surface, and a unit including revolutions counting mechanism and printing mechanism, a gear connected to said measuring unit, a gear connected to said revolutions counting and printing unit, said gears being normally in mesh, said revolutions counting and printing unit being pivotally supported in an unbalanced manner to permit said gears upon occasion to drop apart disconnecting said measuring unit from said revolutions counting and printing unit, a latch normally holding said pivotally supported unit in position to keep said gears in mesh, and means for tripping said latch comprising a member engaging said cloth and normally held thereby in position to keep said latch in active position, said means when unsupported by the cloth moving to latch-releasing position.

3. Cloth measuring and yardage printing device comprising a measuring unit including a roll frictionally rotated by cloth passed against its surface, and a unit including revolutions counting mechanism and printing mechanism, a gear connected to said measuring unit, a gear connected to said revolutions counting mechanism and printing unit, said gears being normally in mesh, said revolutions counting and printing unit being pivotally supported in an unbalanced manner to permit said gears upon occasion to fall out of mesh, a pivotally mounted latch cooperating with means on said revolutions counting and printing unit for normally holding said last named unit in a position in which said gears are in mesh, means connected to said latch and bearing against the cloth on said roll for normally holding said latch in latched position with respect to said latch engaging means, when cloth supported, but moving to latch-releasing position when the end of the length of cloth has passed out from between the roll and latch-holding means, and means for biasing said latch into guiding engagement with the revolutions counting and printing unit when the latch is in released position.

4. Cloth measuring and yardage printing device comprising a measuring unit including a roll frictionally rotated by cloth passed against its surface, and a unit including a shaft and revolutions counting mechanism and printing mechanism associated with said shaft, a gear connected to said measuring unit, a gear connected to said shaft, said gears being normally in mesh, said revolutions counting and printing unit being pivotally supported in an unbalanced manner to permit said gears upon occasion to drop apart disconnecting said measuring unit from said revolutions counting and printing unit, a latch normally holding said pivotally supported unit in position to keep said gears in mesh, means for tripping said latch comprising a member engaging said cloth and normally supported thereby in position to keep the latch in active position, said means when unsupported by the cloth moving to latch-releasing position, and a clutch between said shaft and said gears.

5. In a cloth measuring and yardage printing device, a two-part casing, a shaft mounted in the lower part and rotated responsive to an associated cloth measuring unit, revolutions counting mechanism on said shaft including type dials and control means therefor, the control means for that dial associated with the lowest unit of valuation comprising a gear having sloping sided teeth, inking mechanism in the upper part of said casing including a ribbon cooperably related to said type dials, and an impressing element comprising an arm swingably mounted on the upper part of said casing having a pad adapted to press said ribbon against said type dials for printing from said dials upon a card interposed between said pad and ribbon, said arm including a wedge element reciprocated by said swinging arm upon its movement in a printing direction adapted to enter between said teeth of said control means for moving said control means slightly in one direction or the other to properly align the characters on the type dial controlled by said means with respect to the characters on the other dials.

6. In a cloth measuring and yardage printing device as claimed in claim 5, the length of said wedge element being such as to cause it to function slightly in advance of the printing act.

HANS H. KRAMER.